Nov. 6, 1956   M. L. M. VANSTEENKISTE ET AL   2,769,779
WATER PURIFIER FOR AQUARIUMS
Filed Aug. 27, 1953
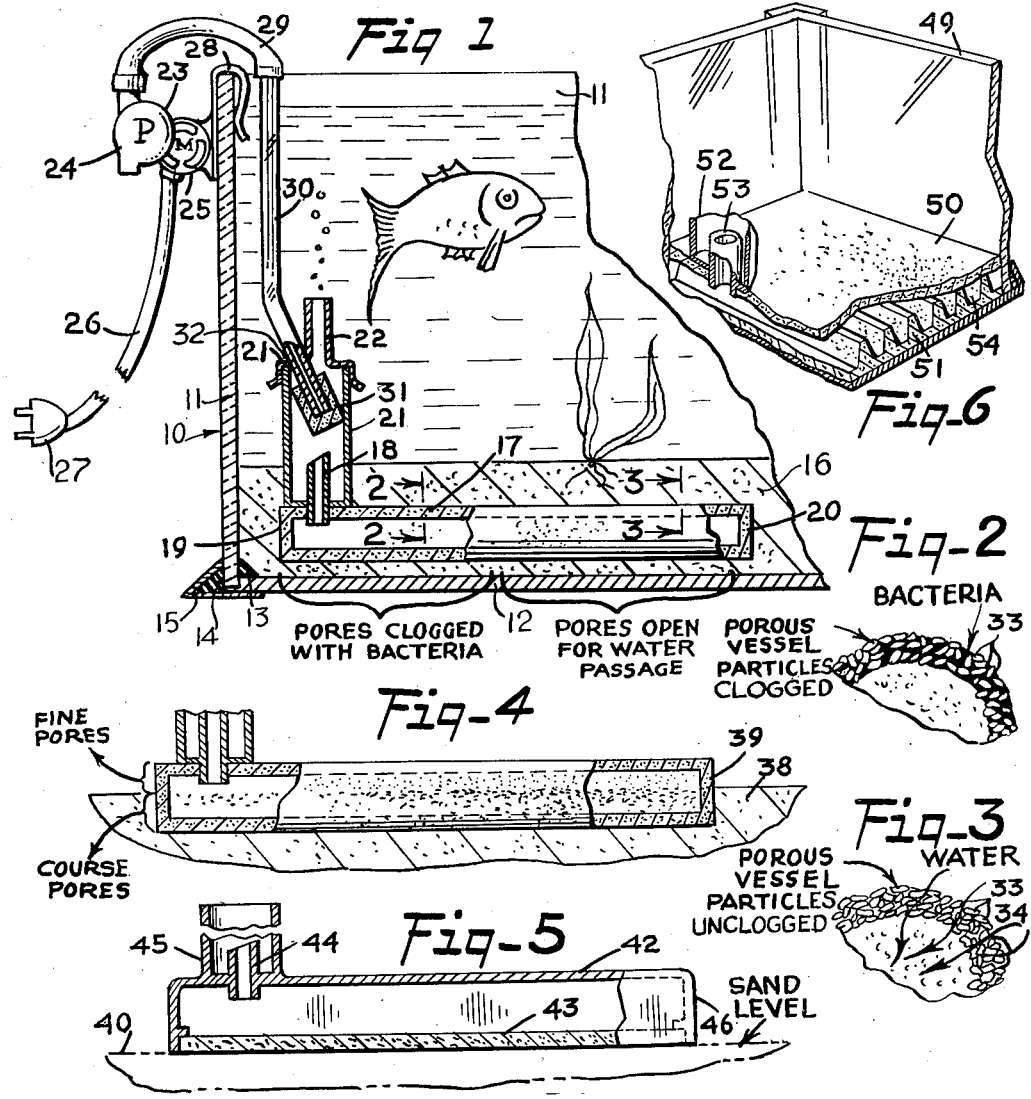
INVENTORS
MARY LOUISE MATHILDE VANSTEENKISTE
& ALFRED VANSTEENKISTE
BY
L. S. Saulsbury
ATTORNEY " # United States Patent Office 2,769,779
Patented Nov. 6, 1956

2,769,779

WATER PURIFIER FOR AQUARIUMS

Mary Louise Mathilde Vansteenkiste and Alfred Vansteenkiste, Montgeron, France

Application August 27, 1953, Serial No. 376,857

1 Claim. (Cl. 210—16)

This invention relates to water purifiers, and more particularly to a water purifier and filtering unit employing a natural filtration principle for use in aquariums.

This invention relates to a porous mass type water filter similar to that described in my Patent No. 2,676,921, dated April 27, 1954.

Nature's process for the purification of contaminated and polluted water occurs through the use of a natural filtering system, as evidenced by the principle occurring to purify stream water. For example, prior to infiltrating into the main stream body, rain water would pass through decomposed vegetable matter and then gravitate through many strata of earth wherein inumerable species of microorganisms and anaerobic bacteria perform, biochemically, the transformation from complex form, organic and mineral substances into simpler and more stable elements. Furthermore, the generation of objectionable chemical decomposition induced by living organisms caused by the action of anaerobic bacteria is arrested in passage of the water through the various layers of earth, thus making the purified water as the end filtered product from the natural process. Since the diffusion of oxygen is not sufficiently rapid in conventional aquarium aeration systems to supply sufficient oxygen to compensate for the deficiencies existing in the depths of the aquarium, anaerobic decomposition can take place readily, even when the supernatant water contains enough dissolved air.

Therefore, it is within the contemplation of this invention to provide a water purifier embodying the above natural principle wherein waste matter is literally burned up and destroyed by the particular bacteria living in the purifier's body. By progressively governing the rate of flow of the aquarium water through the pores of a sintered mass of agglomerated particles, living bacteria in the water will pass through and become lodged within the pores or interstices of the porous sintered mass, and by clogging the porous mass there will be performed biochemically the requisite transformation upon the organic waste substances constituting the clogged portion of the purifier in order to establish an equilibrium in the aquarium and ultimately a purification of the aquarium water. In order to stimulate nature's process of purification a suction or reduced pressure is created within the porous mass to stimulate a flow through the purifier by injecting air under pressure into one side of the purifier, thereby permitting the aerated water to circulate through the pores of the sintered mass wherein aerobic bacteria will flourish profusely to inhibit the action of anaerobic bacteria and the highly putrescible wastes of the aquarium constituted by the unconsumed foods, decayed plant matter, disdigestions, all of which will be absorbed by plants. Thus, the dirt burning bacteria lodged within the porous mass will provide the waste burning media required to maintain the equilibrium in the aquarium purifier.

Therefore, it is an object of this invention to provide a water purifier which will simulate nature's water purification process by lodging waste-burning bacteria within a suitable medium through which contaminated water within the aquarium will flow.

Another object of the invention is to provide a water conditioning device for use in aquariums in which degressive clogging will permit living organisms to arrest the generation of objectionable fermentation due to the action of anaerobic bacteria, whereby purification of the aquarium water will result.

A further object of this invention is to provide a porous agglomerated mass through which polluted water of an aquarium may be passed and microorganisms and anaerobic bacteria will purify the filtered water through a biochemical action.

Still another object of this invention is to provide a water purifier in which differential flow-rates may be established to control the rate of organic decomposition of putrescible wastes.

Another object of this invention is to provide an aquarium with a water purifier which will require substantially no manual cleaning with constant water recirculation and a minimum of maintenance and care.

Other objects of the present invention are to provide a water purifier for use in fish aquariums which is of simple construction, inexpensive to manufacture, compact, and extremly efficient in operation and simple in design.

Other objects and advantages of the present invention will become apparent to those skilled in the art from a consideration of the following general and detailed description of one embodiment of the invention had in conjunction with the accompanying drawings in which the same indicia refer to the same or corresponding parts and wherein:

Fig. 1 is a fragmentary sectional view of an aquarium of one form of water filter embodying the present principle;

Fig. 2 is an enlarged partial sectional view taken substantially along the plane of line 2—2 of Fig. 1 and illustrating its clogged condition;

Fig. 3 is an enlarged partial sectional view taken substantially along the plane of line 3—3 of Fig. 1 and illustrating its unclogged condition;

Fig. 4 is a longitudinal view, partially in section, of another modified form of the present invention partially covered with sand;

Fig. 5 is a longitudinal view, partially in section, of another modification of the present invention;

Fig. 6 is a fragmentary perspective view, partially in section, of a floor assembly embodying another form of the present invention.

Referring now to Fig. 1 wherein is illustrated one embodiment of the invention, submerged within the depths of an aquarium 10 having side walls 11 connected to bottom wall 12 to form an open top vessel for receiving water therein. Between bottom wall 12 and the lower end of the side walls is an internal sealing gasket member 13 and an external sealing gasket 14, both of which adhere to the walls of the aquarium 10 to make the adjoining edges of the wall waterproof. The external sealing member 13 is also held in place by a suitably bent molding strip 15 that surrounds the bottom perimeter of the aquarium 10. On the bottom of the aquarium is a layer of sand 16 in which is embedded a hollow porous cylindrical water purifier 17 into which water from the aquarium may pass. This water will be filtered through the sand and through the porous walls of the cylinder 17. As will be described hereinafter, the water purifier 17 either submerged in sand wholly or partially will effectively entrain living microorganisms and anaerobic bacteria which will destroy waste products in the filtered water. Extending vertically from one end of the porous cylinder is an outlet or suction tube 18 through which the water is drawn. The ends of the cylindrical purifier are closed as indicated at 19 and 20. Surrounding this suction tube 18 and resting upon the porous cylindrical purifier 17 is a relatively large vertically extending non-porous hollow cylinder 21 made from a transparent plastic or other suitable material. The water will flow into this cylinder 21 from the water purifier 17 and fill the same and will then pass outwardly through the nozzle cap 22 on the cylinder 21. The water flow or current is induced by the presence of air which is supplied to the cylinder 21 by a conventional motor pump unit 23 having a pump 24 and an electrical motor 25. The motor 25 is connected by an electric cord 26 and a male plug 27 to an electric source for power to drive the pump 23. The motor pump unit is supported on the edge of the aquarium side wall 11 by a clip bracket 28. The discharge side of the pump is connected by a rubber hose 29 and extension tube 30 which passes down into the aquarium to connect to a cylindrically shaped porous block 31 disposed within the cylinder 21 through an opening 32 in the cap 22. This porous block or head 31 will give off a great volume of small bubbles of air so that a constant flow of air will pass upwardly through the nozzle cap 22 to provide oxygen for the aquarium water. This air, as it leaves the nozzle cap, provides an area of reduced pressure which will induce a current flow of the water which will enter the cylinder 21 coming from the water purifier 17, thus maintaining a substantially constant flow of fluid through the porous purifier 17. The provision of the air bubble flow and the hollow cylinder 21 makes possible the reduced pressure zone which will cause water circulation through the purifier.

The construction of the purifier is an agglomerated mass of either small stable inert particles of ceramic material, or grinding particles, or suitable plastic particles, of either the thermoplastic or thermosetting type. Particle size selected may range from reference sieve grades of 60 up to 400, however, limitations of pore size and water flow will govern the smallest size particles used. A suitable porous bonding agent is required for the agglomeration of ceramic and grinding materials particles which will provide only intermittent surface adhesion of the particles to form a substantially porous mass therethrough. However, very desirable results have been obtained by the use of polystyrene particles of sieve size from 80 to 120 which are sintered into a porous mass, as illustrated in the enlarged views of Figs. 2 and 3. The uneven particles 33 constituting the porous vessel contain many faces about their surfaces and upon adhesion whether by a suitable bonding agent or by adhesion to one another upon the application to a plastic particle there will be formed numerous irregularly shaped voids 34 within the porous mass through which the water may pass and the bacteria become entrained as illustrated in Fig. 2.

The porosity of the purifier will depend largely upon its specific application, for example, when immersed solely in water the crystalline particles will be of finer grade, making the porosity finer in order to increase the pressure drop through the purifier to provide for a greater time increment in which the bacteria may react with the waste matter. However, when the purifier is placed in an environment in which sand is used, the crystalline structure need not be as fine as when no sand is employed. Thus, with coarse sand a finer porous medium is satisfactory, and with fine sand a coarser porosity may be used. The rate of disintegration of the waste matter may be governed by increasing or decreasing the pressure drop of the water flow through the purifier as well as by throttling the air flow into the unit which will increase or decrease the water flow through the purifier.

The cylindrical purifier 17 illustrated in Fig. 1 is submerged under the sand and may be formed of substantially uniformly sized particles since the filtering action of the sand on the water will assist in the biochemical action. The cleansing action will be performed in cycles on the cylindrical circumference of the purifier because as the pores close to the greater suction region, thereby clogging that portion of the unit, the filtering action will progress further down the tube where the pores remain open for water passage and collection of additional microorganisms. The temporary stagnation in the clogged area will permit the bacteria to react to intercept the generation of objectionable fermentations due to the action of anaerobic bacteria by entraining the microorganisms and anaerobic bacteria in this medium, thus permitting the living bacteria in the pores to perform their action by clearing the clogged parts to reestablish equilibrium and purify the water in the process. So, from one end to the other a continuous clogging and clearing action takes place, maintaining the filter in effective operation.

In aquariums with only a shallow sand deposit 38, as shown in Fig. 4, the exposed portion 39 of the purifier will adhere to the above described principle by containing finely ground particles with fine pores between for the part exposed above the sand in contact with the supernatant water, and coarse particles with relatively coarse pores therein will be submerged to be assisted in its action by the sand 38.

Where it is desired to provide ornamentation or a purifier above the sand level 40 as in Fig. 5, a non-porous hollow vessel 42 may be used with a flat plate purifier 43 resting on the sand 40 and satisfactory action will occur as described for the cylindrical purifier as shown in Fig. 1 since the zone of greatest initial suction will occur adjacent the inner tube 44 within the cylindrical air cup 45 and progress towards the sealed end 46.

When the entire bed of an aquarium 49, as shown in Fig. 6, may be covered by a flat porous plate 50, either made of a material similar to the purifier or from a porous structure such as slate or similar structure or a nonporous material having a multitude of apertures therein through which water may pass to the corrugated purifier 51 making up the base of the aquarium, comparable action is obtained. The cylindrical air cup 52 will form the air chamber for the bubbles from the unit similar to that used in Fig. 1 and water will rise through the inner tube 53, thus creating a current flow adjacent the inner tube 53 in the corrugated base purifier 51 to stimulate the desired filtering action. Although a greater surface area is provided for the collection of the waste materials, only a longer period or greater mass flow is necessary to clog the pores or apertures of the structure and to institute the biochemical action as set forth above. Sand or fine gravel may be placed on the plate 50 to assist the reaction in the purifier 51. Channels 54 will provide suitable baffles in the corrugated plate to provide the progressive clogging from the inlet inner tube 53.

Thus it will be apparent that a filtering and water purifier which simulates the principle used in nature applied to purification of the water in an aquarium, whereby the aerobic bacteria is entrained within the minute pores of a porous sintered mass and by biochemical action on the infiltrated organic matter will decompose same to liberate water and nitrogen and oxygen, thereby freeing the clogged pores of the entrained matter and hence purifying the water.

Obviously many variations and modifications of the present invention are possible in the light of the above teachings. It is therefore to be understood that within the scope of the appended claim the invention may be practiced otherwise than as specifically described.

What is claimed is:

A water purifier for aquarium water containing microorganisms comprising a non-porous hollow vessel having top and depending side walls and a bottom opening, a porous flat purifier plate extending over the bottom opening in tight fitting engagement with the side walls and adapted to have contact over its full bottom face with the sand in the bottom of an aquarium when the purifier is rested thereupon, said hollow vessel having a water suction hole in the top wall thereof adjacent to one end of the purifier and a vertically-extending non-porous water pump chamber surrounding the suction hole and extending upwardly away from the top wall, said porous plate being formed of a multiplicity of irregularly contoured agglomerated particles interrelated and bonded together and providing a multiplicity of irregularly formed passages extending upwardly throughout the thickness thereof so that the plate will be caused to be progressively clogged by the microorganisms and gradually be decomposed from one end of the purifier to the other end thereof.

References Cited in the file of this patent

UNITED STATES PATENTS

| | | |
|---|---|---|
| 1,055,082 | Rogers | Mar. 4, 1913 |
| 1,193,335 | Acheson | Aug. 1, 1916 |
| 1,586,292 | Cornwall | May 25, 1926 |
| 2,069,621 | Patrick | Feb. 2, 1937 |
| 2,134,967 | Durgen | Nov. 1, 1938 |
| 2,293,051 | Duffy | Aug. 18, 1942 |
| 2,297,248 | Rudolph | Sept. 20, 1942 |
| 2,324,838 | Harz et al. | July 20, 1943 |
| 2,482,062 | Hanson | Sept. 13, 1949 |
| 2,611,750 | White | Sept. 23, 1952 |
| 2,636,473 | Schwartz et al. | Apr. 28, 1953 |
| 2,674,574 | Pettas | Apr. 6, 1954 |
| 2,676,921 | Vansteenkiste | Apr. 27, 1954 |
| 2,711,828 | Webb et al. | June 28, 1955 |

FOREIGN PATENTS

| | | |
|---|---|---|
| 18,874 | Denmark | June 2, 1914 |